United States Patent Office 3,623,363
Patented Nov. 30, 1971

3,623,363
ULTRASONIC FLOWMETER
Jacques Gerard Dory, Goupvray-Esbly, France, assignor to Realisations Ultrasoniques, Paris, France
Continuation-in-part of application Ser. No. 799,212, Feb. 14, 1969. This application Mar. 9, 1970, Ser. No. 17,619
Claims priority, application France, Mar. 6, 1969, 6906227, 6906228
Int. Cl. G01p 5/00
U.S. Cl. 73—194 A          4 Claims

ABSTRACT OF THE DISCLOSURE

An apparatus for measuring the difference between the times of travel in a fluid of two acoustic pulses respectively transmitted at two points of the fluid and received at the two points after travelling through an identical distance within the fluid, the apparatus comprising acoustic transmitter-receiver means located at the two points, storage means and an electronic switch connected to transmit to the storage means at the instants of reception of the received signals the instantaneous value of a voltage which obeys a predetermined law of variation.

This apparatus may be used as a flowmeter or for detecting a heterogeneous state within a fluid.

CROSS REFERENCE TO RELATED APPLICATION

This application is a continuation-in-part of my copending application Ser. No. 799,212 filed Feb. 14, 1969.

The present invention relates to the measurement of the time acoustic signals take to travel in a given path within a fluid.

This measurement has already been employed for ascertaining the flow of a fluid. The difference between the times taken for effecting a given travel through the fluid by acoustic signals transmitted at the two respective ends of this travel is indeed proportional to the flow of the fluid.

It could also be contemplated to employ such a measurement for detecting within a fluid a difference in temperature, pressure, concentration, chemical composition or any other heterogeneous state.

It is indeed clear that the travelling time depends on these parameters.

In actual fact, in these various applications it concerns the measurement of the difference between the travelling times in the fluid of two acoustic signals respectively transmitted at two points of the fluid and received after having travelled through an identical distance within the fluid.

For this purpose, it has already been proposed to employ at least one pair of transmitter-receiver transducers respectively located at these two points and having their active surfaces in contact with the fluid (directly or through the medium of a wall), means for causing the simultaneous transmission of an acoustic signal by each transducer, means for receiving acoustic signals respectively received by the respective two transducers either after a direct travel from one transducer to the other or after reflection on two reflecting surfaces in contact with the fluid, means for measuring the time lag between the signals received, and means for periodically reversing the connection between the two sound probes and the receiving or measuring means.

More specifically, there has been proposed a method which comprises transmitting acoustic pulses, each of which is preferably constituted by a single oscillation or by a very small number of oscillations, effecting a first measurement of the interval of time between the leading edges of the corresponding signals received through two distinct reception channels, effecting after reversal of the connection between these two reception channels and the transducers, a second measurement of this interval of time and ascertaining the difference between these two measurements.

This differential method is very precise since it permits the total elimination of errors pertaining to the instants of appearance of said leading edges due in particular to delays in the transmission of the signals by the reception circuits.

The object of the present invention is to simplify this differential method by the use of a single reception channel and by effecting a switching between said reception channel and the two transducers in such manner that the signals respectively received by the two transducers are successively applied to the receiving means in the course of two successive transmission cycles.

According to a preferred embodiment, the measurement of the interval of time between the instants at which the two received signals appear is effected by the generation of a voltage, which varies according to a predetermined law advantageously in the form of a saw-tooth, at an instant between the appearance of the first and second signal received, and preferably very close to the second signal, and storing the value of said voltage at the instant of the appearance of the second signal received.

The various features and advantages of the invention will be clearly apparent from the ensuing description.

Figure 1:
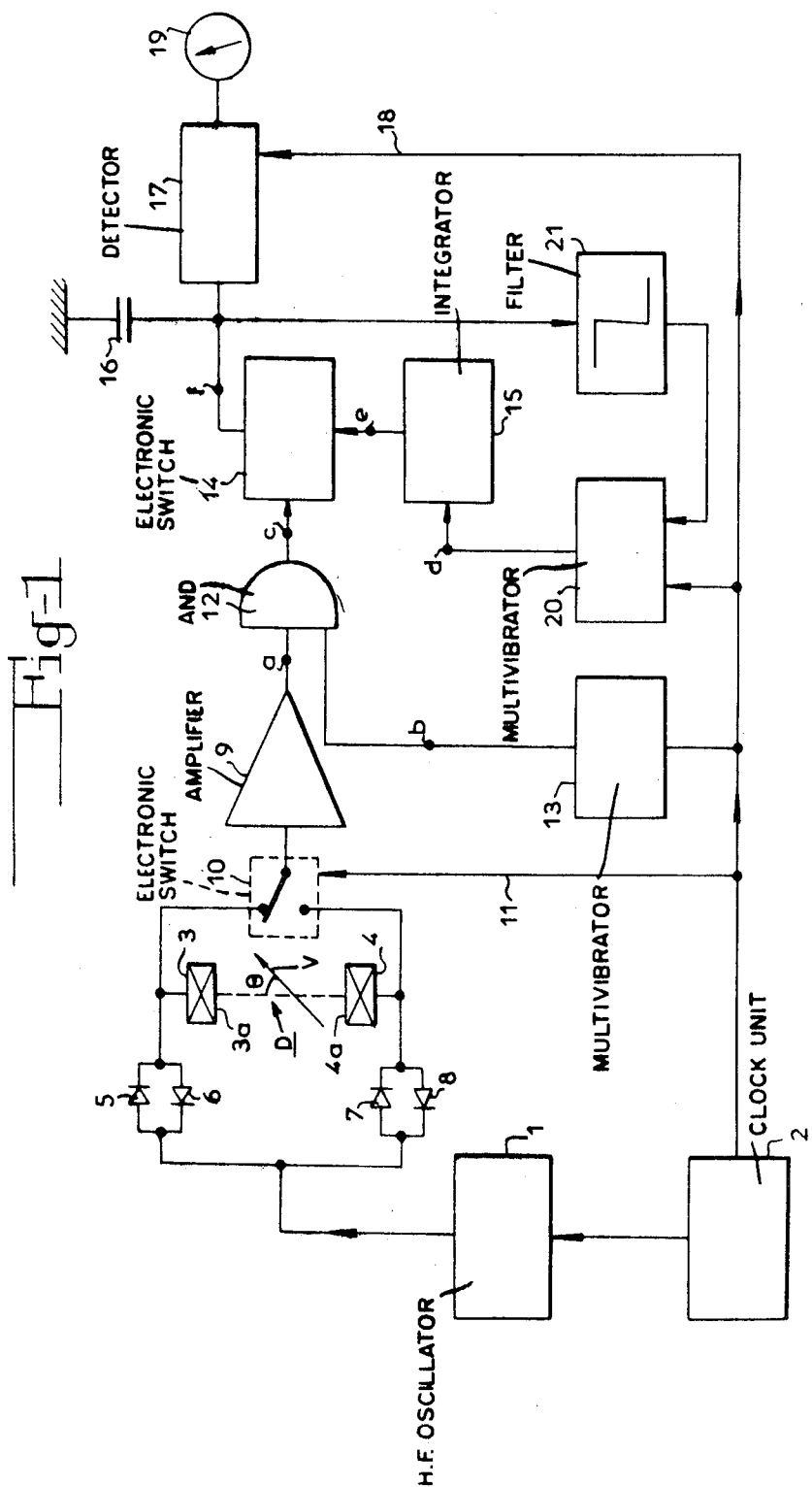
FIG. 1 is a general diagram of a flowmeter according to the invention.

The circuit shown in FIG. 1 comprises a pulse generator 1 generating recurrent electrical pulses. It is in the form of a high-frequency (for example 5 mHz.) oscillator modulated by pulses having a much lower pulse rate (for example 1 kHz.) furnished by a clock 2.

The pulses generated by the generator 1 are simultaneously fed into two transducers 3 and 4 which have their active surfaces 3a and 4a respectively parallel and are so arranged that the acoustic signal can travel from one to the other after having travelled through a path D.

The direction of propagation of the ultrasounds between these two transducers for example makes an angle θ with the direction of the speed V of the flow of the fluid.

By a suitable arrangement of the transducers and the generator 1, it is arranged that each of the acoustic pulses transmitted by the transducers is constituted by a single high-frequency oscillation of short duration or by a very small number of these oscillations. This arrangement can be achieved by one skilled in the art. In this way, very brief pulses, for example having a duration less than a microsecond, are obtained.

The generator 1 is connected to the transducers through two pairs of decoupling diodes connected in opposition, namely diodes 5–6 and 7–8 respectively. These diodes transmit without deformation the high-level transmission pulses fed by the generator 1 to the transducers, but stop the low-level pulses resulting from the reception by each transducer of the pulse coming from the other transducer.

These received pulses are transmitted to a reception amplifier 9 through a switch 10.

The switch is advantageously an electronic switch of known type controlled by the pulses from the clock 2, to which it is connected by a lead 11.

Figure 2:
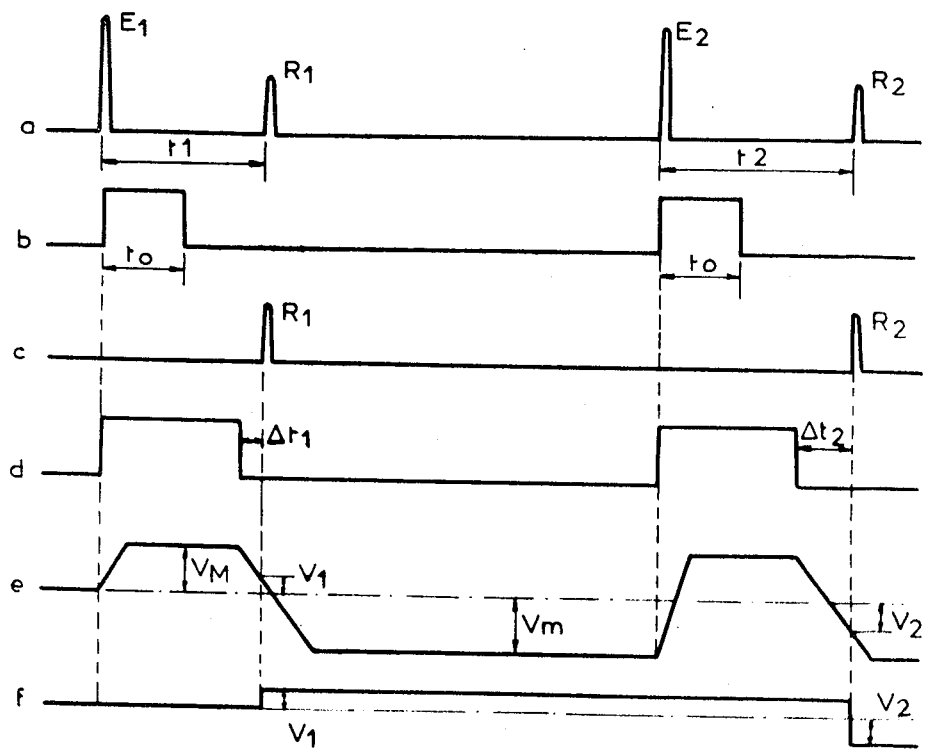
FIG. 2 shows the wave forms in different parts of the circuit shown in FIG. 1.

The output signal of the amplifier 9 is shown at $a$ in FIG. 2. It comprises successive transmission pulses $E_1$, $E_2$, etc. separated by intervals of time of 1000 microseconds in the considered numeral example. In the course of the cycle $E_1$, $E_2$ the switch 10 connects for example the transducer 3 to the amplifier 9 so that the pulse received $R_1$ corresponds to the time of travel of the ultrasounds from the face $4a$ to the face $3a$, that is, in the direction of the current. The interval of time $t_1 = E_1R_1$ is therefore equal to $D/(-c+V \cos \theta)$, wherein $c$ is the speed of propagation of the ultrasounds in the fluid at rest.

In the course of the following cycle, the switch 10 connects the transducer $4a$ to the amplifier 9, so that the interval of time $t_2 = E_2R_2$ is equal to $D/(c-v \cos \theta)$, the propagation of the ultrasounds then being in the counter current direction from the transducer $3a$ to the transducer $4a$.

An AND gate 12 receives, on one hand, the signal $a$ and, on the other hand, a pulse $b$ generated by a monostable multivibrator 13.

This multivibrator is put into its state 1 by the clock pulse (that is, at the instants of transmission) and it remains in this state during a predetermined interval of time $t_0$ which is markedly less than $t_1$ or $t_2$.

Such a monostable multivibrator can be constructed by one skilled in the art. To suitably fix the value of $t_0$, it is sufficient to know the order of magnitude of the flow speed $v$ to be measured and the speed of the sound in the fluid.

The output signal $c$ of the gate 12 thus only comprises the reception pulses $R_1$ and $R_2$. These pulses serve to control an electric switch 14. The latter transmits, at the instants determined by the pulses $R_1$ and $R_2$, the instantaneous value of a voltage $e$ received at the output of an integrating circuit 15.

This integrating circuit comprises for example, in the known manner, an operational amplifier comprising a capacitive negative feedback. It converts a voltage in the form of rectangular pulses fed into its input into a trapezoidal voltage having a predetermined maximum and minimum values.

This voltage in the form of rectangular pulses $d$ is furnished by a monostable multivibrator 20 which is put into the state 1 by the clock pulses and reset to the state 0 in a manner explained hereinafter at an instant which precedes the arrival of an echo $R_1$ or $R_2$ an interval of time $\Delta t_1$ or $\Delta t_2$ which is short relative to $t_1$ or $t_2$. The variation in the width of these pulses from one cycle to the next is negligible.

The leading and trailing edges of these pulses are converted by the integrator circuit 15 into inclined edges having a constant slope, whence the voltage $e$ in the form of trapezoidal pulses and variable between a maximum $V_N$ and a minimum $V_m$ whereas at the instant $R_2$ it reaches an amplitude $V_2$.

The output voltage of the electronic switch 14 therefore assumes values $V_1$ and $V_2$ at instants $R_1$ and $R_2$ so that the charge of a capacitor 16, connected to the output of this switch, varies according to the wave form $f$. The peak-to-peak amplitude of the pulses $f$, equal to $V_1 + V_2$, is proportional to $t_2 - t_1$ and therefore, provided that $c$ does not vary, to the speed $v$ to be measured.

A synchronous detector 17 detects this amplitude and furnishes a signal which is proportional thereto and whose sign depends on that of $t_2 - t_1$ and consequently on the direction of flow of the fluid.

The reference phase, necessary for operation of this synchronous detector, is furnished by the clock 2 to which it is connected by a lead 18.

A measuring or recording apparatus 19 indicates the speed measured.

It should be noted that, as the receiving circuits are the same for the two echos $R_1$ and $R_2$, the transmission delays proper to these circuits are strictly eliminated from the measurement of the difference $t_2 - t_1$.

As the switching rate is high (1000 Hz. in the numerical example given by way of illustration), possible variations in the flow speed from one cycle to the next are negligible, so that the measurement is precise.

As the difference $t_2 - t_1$ is very small (for example of the order of $10^{-8}$ second) relative to the time of travel $t_1$ and $t_2$ which are for example of the order of a few tens of microseconds, the amplitudes V1 and V2 will only be large enough to be conveniently measured if the slope of the training edges of the trapezoidal pulses $e$ is very steep. This is why the intervals $\Delta t_1$ and $\Delta t_2$ should be small relative to the times $t_1$ and $t_2$.

This is achieved by means of a negative feedback loop acting on the multivibrator 20 and comprising a low-pass filter 21 connected between the output of the switch 14 and said multivibrator. This filter applies, to a suitable control electrode of the multivibrator, the mean value of the voltage $f$ which reacts on the width of the pulse $d$. The result of this feedback is that said mean value is maintained constant, which signifies that the width of the pulse $d$ is maintained at a constant mean value and that the echos $R_1$ and $R_2$ always remain within the limits of the trailing edges of the pulses $e$, notwithstanding variations in the speed $c$ for example due to fluctuations in the temperature of the fluid.

The construction of the various elements of the circuit is within the knowledge of one skilled in the art.

The electronic switches 10 and 14 are for example constituted in the known manner by two transistors of the same type connected in opposition and turned off by the application of the control voltage to their common bases or by four ring-connected diodes.

It must be understood that various modifications can be made in the described circuit without departing from the scope of the invention.

For example, in particular, it is possible to employ the circuit shown in FIG. 1 with two transducers having their active faces disposed in the same plane ($3a$–$4a$, FIG. 3) and facing two respective reflecting surfaces ($3b$–$4b$) in contact with the fluid and at respective equal distances from these two surfaces.

Each transducer thus receives the echo, which results from the reflection on the reflecting surface located in front thereof, of the pulse it transmitted. However, the operation of the apparatus remains the same.

Apart from the measurement of a flow this apparatus could also be employed in other applications. Indeed, it can be employed for measuring the difference between the time of travel of two identical acoustic signals in two equal paths within a given fluid. This difference, which is zero in a homogeneous and stationary fluid, can assume significant values, according to very diverse heterogeneous states.

Figure 3:
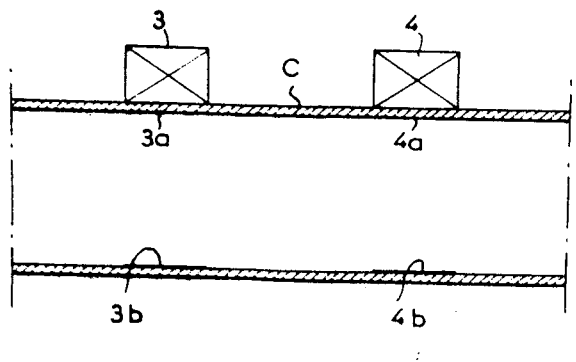
FIG. 3 shows the arrangement of the transducers in the case where the apparatus shown in FIG. 1 is adapted to detect a heterogeneous state within a fluid.

Thus the apparatus shown in FIG. 1, equipped with transducers arranged as shown in FIG. 3 and located on a portion of a conduit C in contact with the conduit along a generatrix of the latter, would indicate the presence of an interface defined by the succession in the conduit of two different liquids (for example oil products flowing through a pipe-line).

I claim:

1. A method for measuring the difference between the times of travel in a fluid of a first brief acoustic signal and a second brief acoustic signal respectively transmitted by two transmitting means at two points of the fluid and received at said two points after travelling through an identical distance within the fluid, comprising employing a single receiving channel for receiving said signals, effecting a switching between said receiving channel and the two transmitting means in such manner that the signals respectively received at said points are successively applied to the receiving means in the course of two successive transmission cycles, measuring the interval of time between the signals respectively received at said two points by causing the generation of a voltage, which varies according to a predetermined law, at an instant between the appearance of the first signal and of the second signal of the signals received and storing the value of said voltage at the instant of appearance of the second signal received.

2. An apparatus for measuring the difference between the times of travel in a fluid of a first brief acoustic signal and a second brief acoustic signal respectively transmitted at two points of the fluid and received at said two points after travelling through an identical distance within the fluid, said apparatus comprising two acoustic transmitting and receiving means respectively located at two different points of the fluid, storage means, an electronic switch connected to transmit to said storage means at the instants of reception of said received signals the instantaneous value of a voltage which obeys a predetermined law of variation.

3. An apparatus as claimed in claim 2, comprising a pulse-generating monostable multivibrator, triggered by said signals transmitted, an integrator of the pulses generated by said multivibrator, and a negative feedback loop which feeds said instantaneous value to said multivibrator so as to maintain the mean duration of said pulses constant.

4. An apparatus for measuring the difference between the times of travel in a fluid of a first brief acoustic signal and a second brief acoustic signal respectively transmitted at two points of the fluid and received at said two points after travelling through an identical distance within the fluid, said apparatus being applied to the detection of the existence of an heterogeneous state within said fluid, said apparatus comprising two transmitting and receiving acoustic probes respectively located at said two points and having active surfaces, and reflecting surfaces in contact with said fluid, said active surfaces being oriented toward said reflecting surfaces.

References Cited

UNITED STATES PATENTS

| | | | |
|---|---|---|---|
| 2,699,677 | 1/1955 | McCallum et al. | 73—194 |
| 2,865,196 | 12/1958 | Bordenave et al. | 73—53 |
| 3,040,562 | 6/1962 | Fitzgerald et al. | 73—61.3 |

FOREIGN PATENTS

| | | | |
|---|---|---|---|
| 231,518 | 11/1960 | Australia | 73—290 |
| 198,000 | 11/1967 | U.S.S.R. | 73—194 |
| 210,404 | 9/1968 | U.S.S.R. | 73—194 |
| 201,690 | 3/1968 | U.S.S.R. | 73—194 |

CHARLES A. RUEHL, Primary Examiner

U.S. Cl. X.R.

73—61.1 R